Patented Apr. 27, 1937

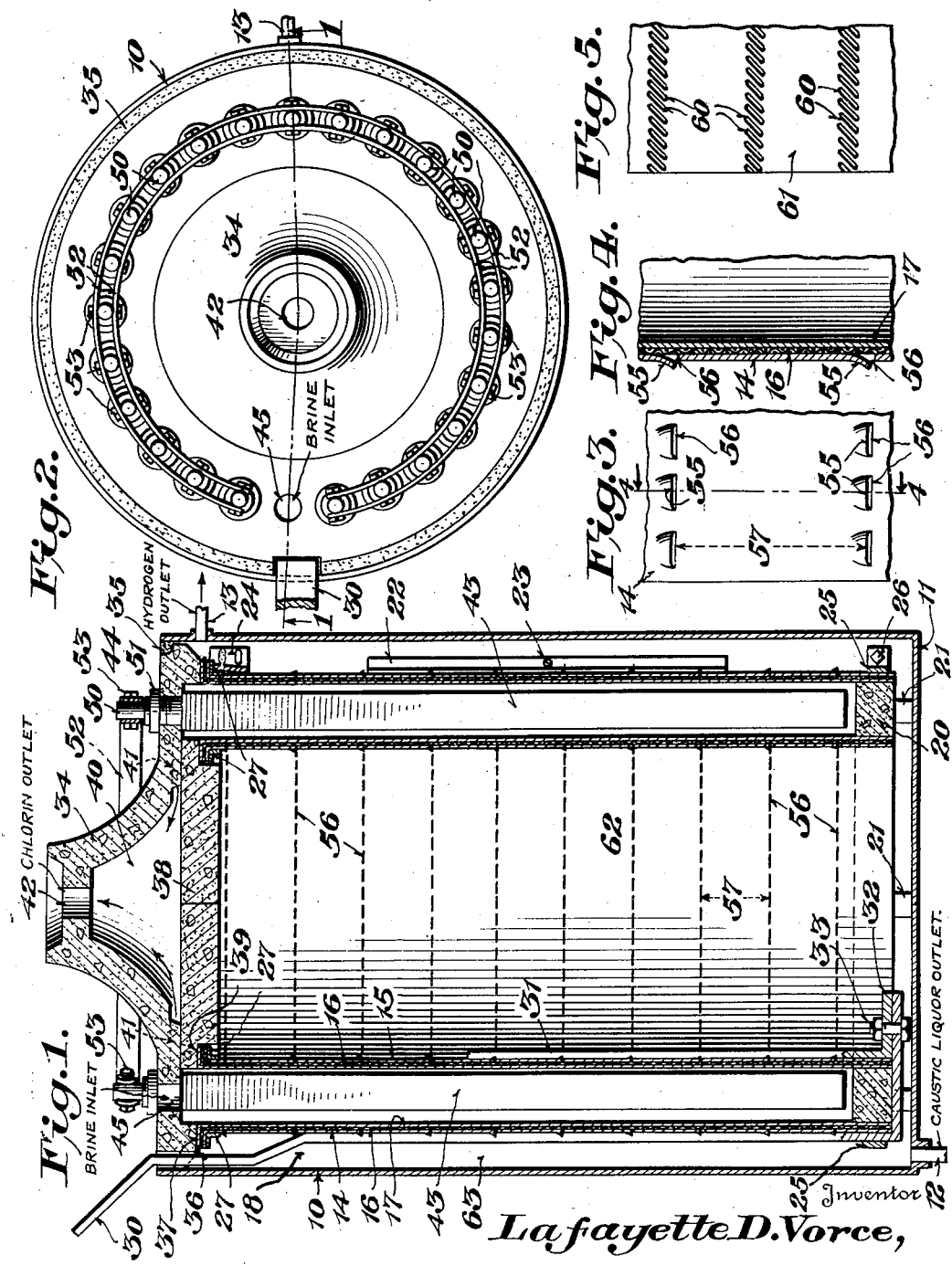

2,078,517

UNITED STATES PATENT OFFICE 2,078,517

ELECTROLYTIC CELL

Lafayette D. Vorce, Montclair, N. J., assignor, by mesne assignments, to Westvaco Chlorine Products Corporation, New York, N. Y., a corporation of Delaware Application October 16, 1934, Serial No. 748,507

7 Claims. (Cl. 204—5)

This invention relates to electrolytic cells; and it comprises a high capacity, low resistance chlorin cell of high electric efficiency containing but a small amount of brine in process at any given time, said cell comprising a housing having a base, a pair of spaced concentric unsubmerged perforated metal cathodes disposed within said housing to provide a peripheral chamber and a central chamber in free communication, a pair of concentric diaphragms supported by the cathodes and defining a narrow annular brine chamber therebetween, an annular closure member forming the bottom of said brine chamber and carrying said cathodes and a plurality of spaced footing members supporting said closure on the base of the housing and providing said free communication; and it also comprises as an improvement in alkali chlorin cells employing a diaphragm and a perforated metal cathode, a structure wherein the perforations are few in number and are arranged in linear series with unobstructed metal therebetween, and a thin easily pervious spacing member is interposed between diaphragm and cathode; all as more fully hereinafter set forth and as claimed.

In the electrolytic manufacture of chlorin and alkali the cost of power bears a high ratio to all other costs; and economy in this respect is desirable. The power used in a cell is of course a direct function of the voltage drop across it. The least ordinary operating voltage of diaphragm cells is usually considered to be about 3.5 volts. The theoretical voltage required for the decomposition of sodium chlorid is 2.3 volts. The difference represents power wasted; or, at least, not usefully employed. Some of this loss is inevitable but some is due to ohmic resistances in the electrolyte and in the electrodes which can be lessened. This is done in the present invention.

The economical desirability of even a small saving in the voltage across the cell is evident. A lessening in voltage of 0.1 in a cell having an operative voltage of 3.5 represents a saving of about 3 per cent in power.

In commercial chlorin cell installations a relatively large number of cells is required, since practical power sources deliver power at a voltage much higher than that taken by a single cell. For example, it is usual to connect 70 to 72 cells in series with a generator delivering power at 250 volts. A large plant may comprise several such banks of cells in parallel.

An ordinary cell of the ordinary dimensions may carry about 1000 amperes without an unduly high current density. The output of alkali and chlorin is of course limited by the electrical input. This type of cell uses an annular unsubmerged cathode with a diaphragm forming a brine chamber into which depend carbon rods arranged in an annulus to form the anode. The axis is not used, being really only a storage space for brine. The axial body of brine serves no useful purpose and moreover soon becomes dilute by the action of the current. In the cell of the present invention I utilize this axial space to permit a higher electrical input to the cell; placing a second cathode and diaphragm in the axis of the cell. The two diaphragms form and define a narrow annular anode chamber. The space within the second or inner cathode forms a chamber for the collection of gas and cell liquor, this inner chamber being in free communication with a peripheral chamber having the same functions.

With the new arrangement, a cell having all the improvements herein described and occupying the same floor space as an ordinary cell taking 1000 amperes may take as high as 2000 amperes while working under equally economical conditions; with a corresponding increase in output of chlorin and alkali. In fact the new cell may take as high as 2500 amperes without an undue increase in voltage. It is obviously desirable to have the producing capacity of individual cells as high as possible, as this reduces the investment in the cell bank and makes for a more compact plant.

The present invention provides a cell of unusually high capacity and low ohmic resistance; all conditions being correlated to this end.

As stated, there is room for a saving in power in the difference between the theoretical voltage, 2.3 volts and the usual working voltage of 3.5 volts. In analyzing the voltage drop across various parts and elements of a standard type diaphragm cell under working conditions it is found that, apart from the decomposition voltage, the greatest voltage drop takes place in the electrolyte; about 0.40 volt. Another voltage drop, about 0.14 volt, occurs across the diaphragm. The voltage drop in the anodes, and that accounted for by resistance in the several electrical contacts, is each about 0.10 volt. The total unproductive voltage drop due to these effects is thus around 0.74 volt.

In the ordinary type of unsubmerged cathode-diaphragm cell now standard in the art and described above, there is an outer casing, usually of steel, forming a chamber for the collection of hydrogen and cathode liquor or cell liquor. When salt, NaCl, is electrolyzed, the liquor is an aqueous solution containing NaOH and an excess of salt. Within this chamber is a perforated steel cathode cylinder mounted in such a way as to leave an annular clearance. The perforations of the cylinder are numerous and as close together as may be. They may be open slots or round holes. Within this cylinder and in direct contact with it is an asbestos diaphragm. The purpose of the cathode perforations is to allow as free egress of cell liquor and hydrogen as possible from the diaphragm-cathode contact surface.

The carbon rods are frequently 30 inches long and 2 inches square and the resistivity is about 0.0085 ohm per cubic centimeter; giving a significant voltage drop from top to bottom. The bottom of the rod is at a less potential than the top of the rod and there is correspondingly less flow of current between anode and cathode. The ohmic resistance of the brine electrolyte (around 2.4 ohms per cubic centimeter under usual working conditions in a cell) aggravates this potential drop. Electrolysis goes on faster at the top of the cell than at the bottom. This results not only in diminishing the capacity of cell but also in some cases causes the carbon electrodes to wear down in undesirable shapes.

In the standard construction described, numerous perforations in the cathode shell are necessary to give free outlet to the cell liquor passing through the diaphragm and to the evolved gas. Retention of hydrogen and caustic liquor in contact with the diaphragm and the cathode gives a back voltage which is highly undesirable. For this reason, it is, as stated, usual to employ numerous closely spaced perforations in the cathode shell. The perforations in a typical cell cathode amount to about 50 per cent of the total cathode area. This has the disadvantage that it not only increases the ohmic resistance to the flow of current through the metal but also reduces the effective area of cathode surface and thus the operating capacity of the cell. Voltage drop measurements made on a perforated cathode of this standard type with a terminal connection to one side of the cathode, show that the voltage drop ranges from 0.023 volt between the terminal connection and points on the cathode adjacent thereto, to as much as 0.065 volt between the terminal connection and points on the cathode remote therefrom, the averaged total drop being about 0.06 volt. In some cathode designs the drop is as high as 0.10 volt.

I have found that by interposing a thin wire gauze separator between the cathode and the diaphragm I can give open avenues for the escape of cell liquor and gas, and that this expedient is so effective that the proportionate area of solid, imperforate metal in the cathode shell can be materially increased; with an improvement in its conductivity. This is done in the present invention. With this drainage layer next the cathode very few openings in the cathode are necessary. It has been found that by providing the spacing member as described the voltage taken by the cell is reduced by about 0.12 volt, which amounts to a saving in power of about 3.5 per cent.

I have found that it is possible to provide that the total area of the sheet metal cathode is retained and available for current-conducting metal. The cathode can consist of solid metal, apertures or slits being formed therein without removal of any metal. Or I can provide a cathode with a relatively small number of narrow perforations, arranged in spaced annular series with a considerable distance of imperforate metal between; broad annular bands of solid metal. In both cases it is advantageous to make a lateral connection for the current the full height of the cathode, thereby making full use of the wide annular bands of solid unobstructed metal around the cathode, to carry the current.

This expedient of reducing the perforate area of the cathode has resulted in a saving of 0.023 volt; a power saving of 0.66 per cent over and above that made possible by the provision of the separator and also allows a considerable increase in capacity, since higher amperages can be employed without an undue current density per unit area of cathode. Moreover the current density is more uniform in and over the cathode.

The separation is useful in connection with the ordinary multiperforated cathode with an improvement in efficiency but its advantages are most manifest with the described low resistance slitted cathode having large imperforate areas; it renders this type of cathode practicable.

Another expedient used in the present cell is to narrow the annular layer of liquid between the anodes and the diaphragm, at the top, to about 0.50 inch instead of the usual separation of about 0.75 inch; and to diminish this separation towards the bottom in a certain definite way. This substantially reduces the ohmic resistance across the electrolyte. To even the passage of current from top to bottom and make the bottom function like the top, the ohmic resistance in the carbon, which gives the indicated voltage drop from top to bottom, is compensated by locating the bottom of the carbons somewhat closer to the diaphragm; by lessening the length of the path across the electrolyte. With the stated clearance of 0.50 inch at the top of the cell between the anodes and the diaphragm there may be 0.25 inch between the anodes and the diaphragm at the bottom of the cell. The variation in separation depends on the resistivity and shape of the anodes and on the nature of the cathodes. For example, the less the perforated area of the cathode the less is the variation in separation from top to bottom. The variation in separation described is more than that necessary merely to compensate for the voltage drop down the length of the anodes. With a diaphragm of uniform thickness from top to bottom, such as is advantageously used in the present invention, the hydrostatic head of the body of brine in the annular inter-diaphragm chamber tends to force more brine through the bottom of the diaphragm than the top. Accordingly the anode-diaphragm separation is further diminished towards the bottom, so that more current is passed through the electrolyte at the bottom, and electrolysis takes place uniformly throughout the electrolyzing zone; the ratio of NaOH to NaCl in the base liquor is raised to that of the top liquor.

The provision of the additional inner cathode used in the present invention aids in securing a narrow annular brine body of small thickness at all points. The inner cathode also narrowly spaced from the anodes increases the effective electrode area and lessens the current density, a greater area of anode surface being directly presented to the cathode surface. The axial column of weak brine of the usual cell is done away with. With an inner cathode chamber of such dimensions as to give an annular clearance between the two diaphragms of 3.0 inches at the top and 2.5 inches at the bottom, an annulus of 2 inch square carbon rods may be arranged in such a way as to given the desired clearance on each side of about 0.50 inch at the top and 0.25 inch at the bottom. The amount of brine in the cell at any time is materially reduced; the brine occurring merely as a narrow annular layer, thin at all points. In the usual feed of this type of cell strong brine enters axially or at some point within the interior, meeting weak brine which dilutes it en route to the zone of electrolysis. In using the present type of cell I introduce strong brine directly into the annulus. The space enclosed by the inner cathode is substantially empty of liquid and serves to collect hydrogen.

In the older type of cells, the entire weight of the contained brine, which may amount to 40 gallons or more for an ordinary sized unit, and of the electrodes, was supported from a cap which, in turn, was carried by the housing. This necessitated heavy construction. In an improved type of cell, covered by my prior Patent No. 1,286,844, this construction was modified by supporting the weight of the cell elements from the base of the housing; the brine chamber, cathode, etc., were not suspended from the top of the housing. In the present invention, I have improved on this type of bottom supported cell in several respects, among them being the lessening of the amount of brine in the cell at any one time. In a standard cell of the present type, the amount of brine in the anode chamber at any time may not be more than 10 gallons, as compared with 40 gallons in the previous types of cells, including that of my Patent No. 1,286,844.

With the cell as so far described, it may be said that the brine is treated in transit and has no opportunity to become diluted. The conductivity of the electrolyte layer between the electrode is enhanced and a further saving in voltage is effected.

In the accompanying illustration, I have shown, more or less diagrammatically, specific embodiments of apparatus within the invention. In this showing.

Fig. 1 is a view in vertical section of the complete cell; the view being taken along line 1—1 of Fig. 2;

Fig. 2 is a plan view of the top of the cell;

Fig. 3 is a fragmentary view in elevation of one form of cathode;

Fig. 4 is a view in vertical section taken along line 4—4 of Fig. 3 and showing the diaphragm and interposed separator screen; and Fig. 5 is a fragmentary view in vertical elevation of another form of cathode within the invention.

In the showings, in which like reference characters indicate like parts, Fig. 1 shows the cell having a cylindrical casing 10 with bottom member 11 having an outlet 12 for caustic liquor and one or more hydrogen outlets 13 near the top of the casing. Within the casing is positioned the cathode assembly shown as comprising two approximately cylindrical sheet metal cathodes 14 and 15, the inner one being smaller than the outer and concentric therewith. The cathodes are tapered slightly toward the bottom, as shown; the separation at the bottom being slightly less than at the top. Each cathode has a foraminous separator member 16 and a diaphragm 17 usually of asbestos paper superposed thereon; the diaphragms of the two cathodes being opposed to each other and defining between them an annular, almost cylindrical chamber 18 extending substantially the entire height of the cathodes. I usually make the separation between the diaphragms at the bottom about half that at the top. This variation compensates for the resistance of the anodes and also compensates for the increased brine flow through the diaphragms near their bottoms due to hydrostatic head. Equalized passage of current between anode and cathode is insured throughout the electrolyzing zone. The separation can conveniently be made about 0.50 inch at the top and 0.25 inch at the bottom. The cathodes are maintained in fixed spaced relation at the bottom and are supported by an insulating spacer ring 20 advantageously of concrete. The weight of the brine and of the cathodes is carried by this spacer. The spacer ring is in turn supported from the cell bottom by means of a plurality of supporting blocks 21. The inner cathode is usually a drawn shell; the outer cathode is a split cylinder of sheet metal made by bending a flat sheet into cylindrical form. The edges of the split are held together by means of angle irons, one attached to each cathode edge adjacent the split as by spot welding. One of the angle irons is shown at 22. The angle irons are held together by nut and bolt 23. Clamping lugs 24 are provided at the top and hoop 25 with draw bolt 26 surrounds the outer cathode at the bottom and gives it added strength. The electrical connection to the cathodes is by means of a heavy bar 30 advantageously of copper extending substantially the entire length of the outer cathode and in electrical union therewith as by welding, and a similar heavy bar 31 similarly attached to the inner cathode and joined in electrical union with bar 30 as at 32 by means of bolt and nut 33. The upper end of bar 30 extends above the top of the cell, as shown.

A cover member 34 shown as of flared shape with a discoid rim portion is supported on the outer cathode and fits closely inside the casing; the narrow crack between the cover and the casing being sealed by annular corrosion-proof and gas-tight packing means indicated at 35. The cover member is advantageously made of concrete. The upper rim of the outer cathode is flanged as at 36 to receive the cover member. The diaphragm material turned over at the flange as indicated at 37 serves to make a tight gasketed joint. A second discoid cover member 38 is provided for the axial chamber defined by the inner cathode. The upper rim of the inner cathode is flanged as at 39 similarly to the outer cathode to support the cover member and to provide a gasketed seal, with the aid of the diaphragm material. An annular angle-iron band 27 surrounds each cathode adjacent the flange, as shown. The two cover members define between them a chamber 40, in communication with the inner cathode space 18 through slots 41. A chlorin outlet 42 is provided in the top of cover member 34 in communication with this chamber as shown.

Cover member 34 holds an annular series of carbon electrodes or anodes 43, advantageously of square cross section and hanging down into the chamber 18 between the cathodes as shown. The anodes are spaced equally from both diaphragms. On account of exigencies of drawing, the anode showing in the left hand side of Fig. 1 appears unequally spaced; but this is only apparent. The anode showing in the right-hand side of Fig. 1 shows the equal spacing. The anodes have cylindrical portions 44 fitting closely in perforations 45 in the cover member and extending above the cover member. The extensions above the cover member are threaded and lead nuts 51 on the threaded portion retain the anodes in place. The upper ends of the rods are further extended as at 50. Electrical connection is made to extensions 50 by means of annular copper bus-bars 52 bolted to each extension 50 by a bolt and nut 53, as shown. Perforations 45 are equally spaced around the cover member. One of the perforations 45 is left open, containing no anode, and serves as a means for introducing brine into the annular chamber 18. Suitable feed regulating apparatus (not shown) delivers brine at this point. Twenty-four anodes are shown. This is a convenient number. The annular bus-bar ends at each side of the brine inlet perforation, as shown. The electrical connections for the anodes comprise a plurality of heavy cables connected at spaced intervals to the annular bus-bars 52 and leading to the cathode of the next cell in the battery series. These are omitted for the sake of simplicity of showing.

One specific embodiment of the outer cathode separator and diaphragm arrangement is shown in detail in Figs. 3 and 4. The cathode is of relatively thin sheet steel; usually about 1/16th inch thick. The metal is slit in such a way as to provide a plurality of spaced slits 55. No metal is removed in forming these slits. The sheet metal is slit and one lip formed outward to leave a narrow aperture as at 56. The aperture opening can be approximately 1/64 inch. The lateral width of the slits can be around ½ inch, and the slits spaced apart ⅜ inch to ½ inch. The metal is advantageously forced out on the side of the cathode which is inactive; the rear face. The slits are formed in annular rows, spaced vertically as at 57. In a cell of conventional size there may be about 80 slits in each annular row in the outer cathode, and about 50 in each annular row in the inner cathode. The vertical spacing is such as to leave broad annular bands of solid metal; bands usually from 3 to 5 inches in width. In fact, for the horizontal flow of current provided, the cathode behaves as if it were a simple cylinder of imperforate, solid metal. Were such a cathode used in an ordinary cell, the diaphragm being laid directly thereon, the cell efficiency would be greatly reduced; because the migration of gas and caustic liquor towards the sparsely spaced openings would be impeded. Further in accordance with the invention, however, separator means are provided between cathode and diaphragm. On the active side of the cathode is positioned the foraminous separator member of wire cloth or screen 16 and superposed thereon is the diaphragm 17 of asbestos paper or the like. The screen is advantageously woven iron wire cloth, the wire being of 24 to 32 gage and the cloth having from 9 to 14 strands to the inch. Twelve-mesh No. 28 gage steel gauze is convenient. The screen permits ready passage of caustic liquor and of hydrogen from the diaphragm to and through slits 48. Liquor and gas formed at the solid portions of the cathode readily passes through the interstices of the screen to the nearest slit opening and escapes. The inner cathode arrangement is similar, slits 55 being formed with the metal forced out in the inner, inactive face. In the view of the complete cell in Fig. 1, the relative thicknesses of the cathode, separator and diaphragm are shown somewhat exaggerated, for the sake of clarity of showing.

Fig. 5 shows an alternative modification in which annular series of narrow slots 60 are formed in the cathode metal as by punching, some metal being removed in the punching. The series of slots are separated by broad bands 61 of solid metal, carrying the current. The bands can be 3 inches or more in width. The perforate area is less than 10 per cent of the total cathode area.

In operation a potential difference is applied across the cell and brine is fed into the inter-diaphragm chamber 18. This space is filled to a level corresponding with the top of the cathodes. Electrolysis takes place with the formation of chlorin, caustic soda and hydrogen. Chlorin gas bubbles up through the liquid in chamber 18 and escapes through slots 41, chamber 40 and outlet 42, whence it is pumped away. Caustic soda, formed at the cathodes, percolates freely through the reticulated separator, to and through the cathode openings, and runs down the walls of the cathode to the bottom of the casing, whence it escapes through outlet 12. Hydrogen, also formed at the cathode, escapes freely through the screen reticulations and through the cathode perforations into the axial chamber 62 enclosed by the inner cathode and also into an annular chamber 63 between the outer cathode and the casing. Hydrogen is drawn off as formed, through outlet 13. Hydrogen from chamber 62 passes into chamber 63 through the communicating spaces between supporting blocks 21. In operation, chambers 62 and 63 are substantially empty of liquid; caustic liquor being drawn off through outlet 12 as fast as it is formed.

The separator screen obviates any building up in pressure of hydrogen or concentration of caustic liquor. Hence contamination of chlorin by hydrogen and diffusion of caustic liquor back through the diaphragm into the brine body are substantially eliminated.

The cell of the present invention has much higher capacity than conventional type cells. A cell according to the invention made in standard size can be run at 2,000 amperes, under conditions of maximum economy. The amperage can be increased considerably above this value without undue rise in voltage. Brine can be fed more rapidly than in conventional cells. The cell voltage is around 3.0 volts. There is a saving in power cost of 10 to 15 per cent with respect to conventional type cells. The electrical efficiency is high, and contamination of the cell products is materially lessened. The cell can be used for electrolyzing solutions of various salts, e. g., of KCl to give chlorin and caustic potash, and the stated advantages are realized in every case.

What I claim is:—

1. A chlorin cell of high capacity and low resistance comprising as an anode a plurality of carbon rods depending into a narrow electrolyte chamber, two concentric diaphragms defining said electrolyte chamber and said chamber being wider at the top than at the bottom, two concentric perforated sheet metal cathodes, the total area of the openings through the perforations being a minor fraction of the area of the cathodes, the perforations being few in number and arranged in spaced annular series with relatively large areas of imperforate continuous metal between series, electrical connection means extending longitudinally along the cathodes, a fine wire mesh between each cathode and the corresponding diaphragm, an enclosing housing spaced from the outer cathode to form an annular chamber for gas and cell liquor therebetween, the inner cathode bounding a second chamber, connections for withdrawing gas and cell liquor from this chamber and from the chamber bounded by the inner cathode and means for feeding brine into the annular electrode chamber.

2. The apparatus of claim 1 wherein the separation between each cathode and the series of carbon rods at the top is about 0.50 inch and that at the bottom is about 0.25 inch, to equalize the passage of current between cathode and anode at the top and bottom of the cathodes.

3. The apparatus of claim 1 wherein the total solid metal area of each cathode is at least 90 per cent of the total area of the cathode including perforations.

4. The apparatus of claim 1 wherein each cathode is provided with opened straight elongated slit perforations, no metal being removed, the slits being parallel to the direction of current flow through the cathode, and the metal area of each cathode is substantially 100 per cent of the square area of the cathode.

5. A chlorin cell of high capacity and low internal resistance comprising as an anode a plurality of carbon rods depending into a narrow electrolyte chamber, two concentric diaphragms defining said electrolyte chamber, said chamber being spaced about half an inch from the anodes at the top and about a quarter of an inch therefrom at the bottom, two concentric slitted metal cathodes, the slits being disposed in annular series spaced along the height of the cathode leaving large bands of imperforate metal between the series, the slits being substantially straight and horizontal, a fine wire mesh separator between each cathode and the corresponding diaphragm, electrical connections for the cathodes extending vertically thereover in a direction perpendicular to the series of slits, an enclosing housing spaced from the outer cathode to form an annular chamber for gas and cell liquor therebetween, the inner cathode bounding a second chamber, connections for withdrawing gas and cell liquor from this chamber and from the chamber bounded by the inner cathode, means for feeding brine into the annular electrode chamber and a supporting closure for the cathodes defining the bottom of the electrode chamber and supporting the cathodes.

6. The apparatus of claim 1 wherein the separator is made of woven iron wire cloth of about 24 to 32 gage and having about 9 to 14 strands to the inch.

7. In a chlorin cell, the improvement comprising a pervious diaphragm, a substantially cylindrical cathode and an interposed separator of fine woven wire cloth, the cathode being sheet metal provided with parallel spaced annular rows each containing a plurality of substantially straight, pierced slit openings, with broad annular bands of solid unpierced metal between said rows, the area of said bands being much greater than that of the slit openings, and a cathode electrical connection in the form of an elongated conducting member extending over said cathode substantially parallel to the longitudinal axis thereof and substantially perpendicular to the rows of slit openings and in electrical contact with said cathode, whereby current flow takes place along said bands of solid metal parallel to said slits, the slit openings allowing free egress of gas and liquor percolating through the wire cloth separator.

LAFAYETTE D. VORCE.